Dec. 3, 1940. H. H. MILLER 2,223,943
ILLUMINATED CABINET
Filed March 7, 1936
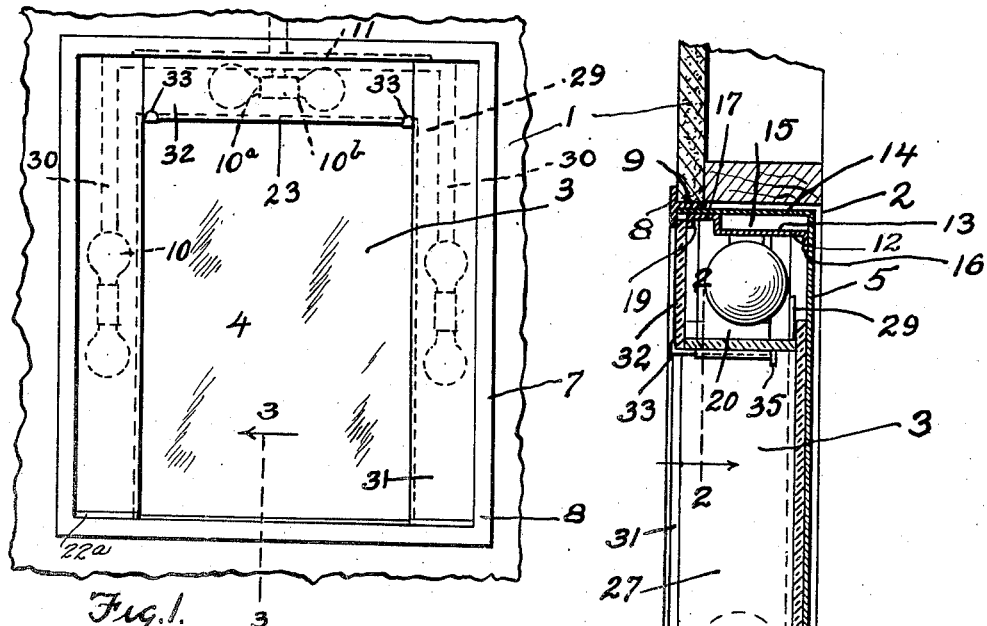
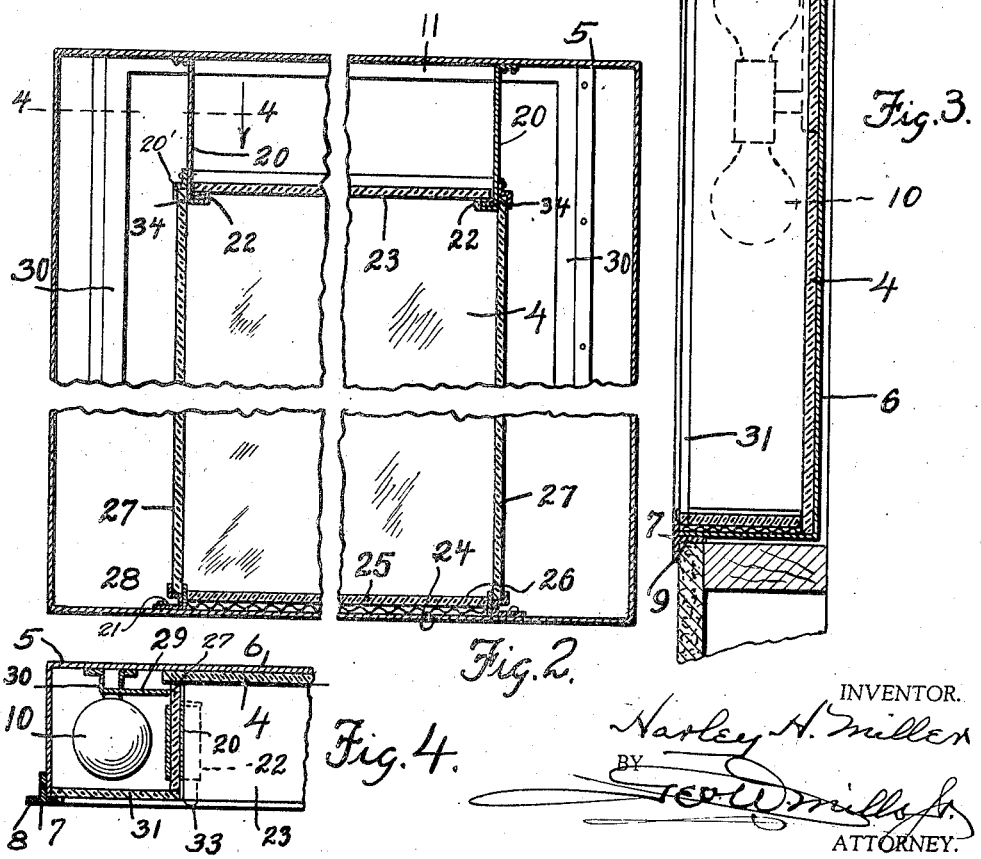
INVENTOR.
Harley H. Miller
BY
ATTORNEY.

Patented Dec. 3, 1940

2,223,943

UNITED STATES PATENT OFFICE 2,223,943

ILLUMINATED CABINET

Harley H. Miller, Middletown, Ohio, assignor to The Philip Carey Manufacturing Company, a corporation of Ohio Application March 7, 1936, Serial No. 67,699

17 Claims. (Cl. 240—4.2)

This invention relates to illuminated mirror units, and pertains particularly to a unit which is adapted to be inserted in the wall with the mirror portion set back from and lighted by lights disposed about the mirror, some being preferably beside and above the mirror. The lights are preferably covered with plain, frosted or colored glass plates that may be readily assembled on and disassembled from the unit to give ready access to the lights for repairing any of the light fixtures or for replacing the light bulbs. The lights and mirror are preferably assembled as a unit for being conveniently mounted on a wall in much the same manner as medicine cabinets which are commonly used.

Generally described the invention comprises a casing or frame member having a back wall and surrounding top, bottom and side walls. The casing or frame member may be formed of any rigid material, such as metal or the like. Mirrors may be mounted on the back wall and on the bottom wall. The mirror on the bottom wall is mainly a mirrored shelf, and may be a reflecting mirror or merely of plain, colored or frosted glass. Surrounding the mirror on the back wall of the casing or frame member, are top and bottom lights set off in compartments by colored or frosted glass plates. In order to mount these glass plates and also for mounting the casing or frame member on the wall, a facing frame, preferably of T construction, may advantageously be secured to the frame or casing member with the head of the facing frame extending to seat over the margin of the wall and also to provide a seat for portions of the front glass plates. The other glass plates surrounding the lights seat at one end in a recess provided in the shelf and at the other end against brackets mounted preferably on the top and rear walls. These brackets, if a top light be used, may advantageously project to provide ledges for seating a glass plate oppositely disposed to the bottom shelf. The front top plate is of a length sufficient to permit it to seat between and abut the side front plates for holding them in assembled relation. It is mounted upon clips adjustably connected to some stationary part of the frame. These clips may be moved to permit the top front glass plate being readily removed or inserted in place between the clips and the T frame to abut against the edges of the junction box leading to the top light and the glass plate mounted on the bracket. The clips secure the front glass plate in position, and the front glass plate in turn secures the other glass plates in position. Accordingly ready assembly and disassembly is permitted by means of the clips without any permanent attachment of any of the glass plates. As a result easy access is permitted to any one or all of the lights.

For a better understanding of the invention, reference may be made to the accompanying drawing in which:

Fig. 1 is a front elevation of a wall section having associated therewith an illuminated mirror unit embodying the present invention;

Fig. 2 is a vertical cross-section of Fig. 1 on line 2—2 of Fig. 3, with the light fixtures removed;

Fig. 3 is a vertical cross-section on line 3—3 of and at right angle to Fig. 1; and Fig. 4 is a horizontal section on line 4—4 of Fig. 2.

Referring to the drawing in which like numerals are used to designate like parts, numeral 1 is a wall section having a recess 2 formed therein to receive an illuminated mirror unit 3. The illuminated mirror unit comprises a mirror 4 and a frame or casing 5. This frame or casing may be of any desired depth to provide a recessed compartment in which the mirror may be mounted upon the back wall 6 set back from the front of the wall in which the frame or casing is inserted. Surrounding the edge of the frame member is a flanged facing piece 7 which preferably is in the form of a T with the head 8 arranged to overlap the wall section and to fit over the edges of side and end walls of the frame or casing member. This facing piece may be of any decorative material such as chromium plated brass or the like. The base portion 9 of the facing piece overlaps with the side and end walls of the frame member and may be welded or secured thereto by any suitable means.

Any number of lights 10 may be disposed about the unit with the necessary wires leading in through suitable junction boxes. A light may advantageously be mounted at the top and on each side, and if desired may have double sockets 10a and 10b provided therein. The junction box 11 for the wire leading to the top light may advantageously be of a structure to cooperate in providing a recess for seating one edge of a plate hereinafter described. It is offset at 12 to space a portion 13 from the top wall 14 of the casing to provide a recess 15. One end 16 abuts the back wall 6, and the other end 17 abuts the top wall 14 with a portion 19 spaced from the head of the frame member. The contacting portions of the ends 16 and 17 with the back and top walls may be preferably secured as by spot welding.

A pair of brackets 20 are mounted on the cabinet, preferably to the top and back walls, being attached thereto at one end and extending to provide ledges 22 upon which is seated glass plate 23. Opposite to plate 23 there is provided on the bottom wall 24 a mirror or a colored or frosted glass 25. This is preferably seated in the space 26 between and with its ends abutting side glass plates 27 to hold them against angle bars 21 which are screwed or otherwise attached to the bottom wall of the cabinet in spaced apart relation. The top ends of plate 27 rest against the brackets 20 and are suitably held thereagainst by angle clips 20' screwed or otherwise attached to the brackets. A fin 29 extends from each side of the junction boxes 30 to the adjacent brackets to provide with the walls of the cabinet an enclosure for the wires leading through the brackets to the socket for the top light.

The front of the side light compartments are covered with plates 31, the ends of which are supported by U-shaped channel members 22a attached to the top and bottom walls. These are of the same width as the side plates 31 and have the recess of the U-shaped member receiving the end of the plate and the other side, the side opposite the recess, attached to the cabinet wall. There are four of these channel members, one for each end of the two front plates. Two are attached to the bottom wall and two are attached to the top wall of the cabinet. One edge of the plates is overlapped by the facing 7. The front plates 31 are spaced apart and secured in position by a top front plate 32. This top front plate 32 is advantageously seated upon clips 33 slidably mounted in recesses 34 formed in ledges 22 of the bracket members. The clips are limited in their movements by stop flanges 35 formed on one end. The opposite ends may be provided with oppositely disposed flanges to abut against the margin of the top front plate. The top front plate is somewhat narrower in width than the space between the top wall of the casing and the brackets, thereby permitting it to be raised and the clips pushed in with the head abutting the edge of plate 23. This permits the top front plate to drop and be readily disassembled. It may be readily assembled by reversing the steps. After it is removed the other glass plates are then readily removable also, and when in place it holds all the other plates in position. This construction permits ready access to the light fixtures mounted on the illuminated mirror unit at all times, and provides a unit having the mirror and lights already assembled.

In this embodiment, I have shown lights disposed on each side and at the top surrounding the mirror. However, the top light, if desired, may be omitted.

While I have shown and described one embodiment in detail for carrying out the invention, it will be understood that there may be various changes and variations without departing from the spirit of the invention.

I claim:

1. An illuminated mirror unit comprising a casing having a back wall upon which a mirror is adapted to be mounted and a side wall disposed adjacent the back wall, a light mounted adjacent the side wall, and glazed translucent plates disposed at an angle to each other cooperating with the side and back walls for enclosing the light in a compartment adjacent the mirror with illuminating zones disposed in different planes, one translucent plate abutting the other plate for holding same in assembled relation.

2. An illuminated mirror unit comprising a casing having a back wall upon which a mirror is adapted to be mounted and a side wall disposed adjacent the back wall, a light mounted adjacent the side wall, translucent plates disposed at an angle to each other cooperating with the side and back walls for enclosing the light in a compartment adjacent the mirror with illuminating zones disposed in different planes, one translucent plate abutting the other plate for holding same in assembled relation, and means for holding the plates in position for readily assembling and disassembling them.

3. An illuminated mirror unit comprising a casing having a back wall upon which a mirror is adapted to be mounted and side walls disposed adjacent the back wall, side and face plates cooperating with the side walls to form side compartments for lights adjacent the mirror for illuminating same, a readily assembled and disassembled plate means for spacing the face plates apart, and a clip for supporting said means to permit ready assembly and disassembly of the plates.

4. A mirror unit comprising a casing having a back wall upon which a mirror is adapted to be mounted and side and top walls adjacent the back wall, top and side translucent plates cooperating with the side and top walls to provide top and side compartments adapted to receive a light, a face plate covering each of the compartments, the face plate for the top compartment spacing apart the face plates for the side compartments, means comprising a clip for supporting the face plate of the top compartment, and means for movably mounting the clip for readily assembling and disassembling said top, side and face plates.

5. A mirror unit comprising a casing having a back wall on which a mirror is mounted and top and side walls adjacent the mirror, oppositely disposed translucent side plates cooperating with the side walls to provide side compartments adapted to receive a light, a translucent top plate disposed between the side plates cooperating with the top wall to provide a top compartment, side face plates disposed to abut the side plates and enclose the side compartments, a top face plate disposed between the side face plates to secure same in position, and a clip adapted to be actuated to release the top plate, said side, top and face plates being readily attachable and detachable.

6. A mirror unit comprising a casing having a back wall on which a mirror is mounted and top and side walls adjacent the mirror, oppositely disposed translucent side plates cooperating with the side walls to provide side compartments adapted to receive a light, a translucent top plate disposed between the side plates cooperating with the top wall to provide a top compartment, bracket means for supporting the top plate, face plates disposed to abut the side plates and enclose the side compartments, a top face plate disposed between the other face plates to secure same in position, and a clip mounted on the bracket means for supporting the top face plate, said side, top and face plates being readily attachable and detachable.

7. A mirror unit comprising a casing having a back wall on which a mirror is mounted and top and side walls adjacent the mirror, oppositely disposed translucent side plates cooperating with the side walls to provide side compartments adapted to receive a light, a translucent top plate disposed between the side plates cooperating with the top wall to provide a top compartment, bracket means for supporting the top plate, face plates disposed to abut the side plates and enclose the side compartments, a top face plate disposed between the other face plates to secure same in position, and a slidable clip mounted on the bracket means for supporting the top face plate, said side, top and face plates being readily attachable and detachable.

8. A mirror unit comprising a casing having a back wall on which a mirror is mounted and top and side walls adjacent the mirror, oppositely disposed translucent side plates cooperating with the side walls to provide side compartments adapted to receive a light, a translucent top plate between the side plates cooperating with the top wall to provide a top compartment, bracket means for supporting the top plate between the side plates and disposed to space the side plates, face plates disposed to abut the side plates and enclose the side compartments, a top face plate disposed between the other face plates to secure same in position, and a clip mounted on the bracket means for supporting the top face plate, said side, top and face plates being readily attachable and detachable.

9. An illuminated mirror unit comprising a mirror, a lighting compartment adjacent the mirror for lighting same, including a translucent closure plate for one side of the compartment and a translucent plate for the front of the compartment, said plates being disposed at an angle in abutting relation for holding same in assembled relation and enclosing said lighting compartment, and a clip which is readily released to permit ready insertion and removal of the closure plates.

10. An illuminated mirror unit comprising a mirror, a lighting compartment adjacent the mirror for lighting same, a translucent closure plate for one side of the compartment, a bracket for supporting the closure plate, a translucent closure plate for the front of the compartment and a clip movably mounted upon the bracket to permit ready removal of the closure plates.

11. An illuminated mirror unit comprising a mirror set back of a side and a top lighting fixture disposed adjacent the mirror in the set back portion, readily removable side and top plates adjacent said side and top lighting fixtures, and readily removable face plates cooperating with the side and top plates to provide enclosures for the lighting fixtures disposed adjacent the mirror.

12. An illuminated mirror unit comprising a bottom mirror and a rear mirror disposed substantially perpendicular to the bottom mirror, top and side compartments adjacent the mirrors adapted to receive lighting fixtures for illuminating said mirrors and comprising translucent closure plates disposed at an angle in abutting relation for holding same in assembled relation, said rear mirror being set back from the bottom mirror and the illuminating compartments.

13. An illuminated mirror unit comprising a casing having a back wall upon which a mirror is adapted to be mounted and side and top walls adjacent the back wall, top and side translucent plates cooperating with the side and top walls to provide top and side compartments adapted to receive a light, a face plate covering each of the compartments, the face plate for the top compartment spacing apart the face plates for the side compartments, means comprising a clip for supporting the face plate of the top compartment and permitting ready assembly and disassembly of said plates, means for movably mounting the clip and a lighting means disposed within the compartments.

14. An illuminated mirror unit comprising a casing having a back wall on which a mirror is mounted and side walls adjacent the mirror, oppositely disposed translucent side plates cooperating with the side walls to provide side compartments, a top plate disposed between the side plates cooperating with the top wall to provide a top compartment, side face plates disposed to abut the side plates and enclose the side compartments, a top face plate disposed between the side face plates to secure same in position, a clip adapted to be actuated to engage and release the top plate for readily assembling and disassembling said plates, and a lighting means disposed within the compartments.

15. An illuminated mirror unit comprising a casing having a back wall on which a mirror is mounted and side walls adjacent the mirror, oppositely disposed side plates cooperating with the side walls to provide side compartments, a top plate disposed between the side plates cooperating with the top wall to provide a top compartment, bracket means for supporting the top plate, translucent face plates disposed to abut the side plates and enclose the side compartments, a top face plate disposed between the other face plates to secure same in position, a clip mounted on the bracket means for supporting the top face plate and permitting ready assembly and disassembly of said top face plate and a lighting means disposed within the compartments.

16. An illuminated mirror unit comprising a casing having a back wall on which a mirror is mounted and side walls adjacent the mirror, oppositely disposed translucent side plates cooperating with the side walls to provide side compartments, a translucent top plate disposed between the side plates cooperating with the top wall to provide a top compartment, bracket means for supporting the top plate, translucent face plates disposed to abut the side plates and enclose the side compartments, a translucent top face plate disposed between the other face plates to secure same in position, a slidable clip mounted on the bracket means for supporting the top face plate and permitting ready assembly and disassembly of said plate and a lighting means disposed within the compartments.

17. An illuminated mirror unit comprising a casing having a back wall on which a mirror is mounted and side walls adjacent the mirror, oppositely disposed side plates cooperating with the side walls to provide side compartments, a top plate between the side plates cooperating with the top wall to provide a top compartment, bracket means for supporting the top plate between the side plates and disposed to space the side plates, face plates disposed to abut the side plates and enclose the side compartments, a top face plate disposed between the other face plates to secure same in position, some of the said plates being translucent, a clip mounted on the bracket means for supporting the top face plate and permitting ready assembly and disassembly of said plate and a lighting means disposed within the compartments.

HARLEY H. MILLER.